(12) United States Patent
Xu

(10) Patent No.: US 10,182,058 B2
(45) Date of Patent: Jan. 15, 2019

(54) METHOD, DEVICE AND SERVER FOR MANAGING USER LOGIN SESSIONS

(71) Applicant: Alibaba Group Holding Limited, Grand Caymon (KY)

(72) Inventor: Dian Xu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 113 days.

(21) Appl. No.: 15/146,074

(22) Filed: May 4, 2016

(65) Prior Publication Data
US 2016/0330206 A1    Nov. 10, 2016

(30) Foreign Application Priority Data
May 7, 2015    (CN) .......................... 2015 1 0229467

(51) Int. Cl.
*H04L 29/00*    (2006.01)
*H04L 29/06*    (2006.01)

(52) U.S. Cl.
CPC ............ *H04L 63/102* (2013.01); *H04L 63/08* (2013.01); *H04L 63/20* (2013.01)

(58) Field of Classification Search
CPC ....... H04L 51/38; H04L 69/329; H04L 51/36; H04L 67/1097; H04L 69/08
See application file for complete search history.

(56) References Cited

U.S. PATENT DOCUMENTS

| 7,475,422 B1 | 1/2009 | Bull et al. |
| 7,546,630 B2 | 6/2009 | Tabi |
| 7,962,635 B2 | 6/2011 | Naidu et al. |
| 8,079,042 B2 | 12/2011 | Foti et al. |

(Continued)

FOREIGN PATENT DOCUMENTS

| CN | 103812940 A | 5/2014 |
| WO | 2001071525 A1 | 9/2001 |

(Continued)

OTHER PUBLICATIONS

International Search Report and Written Opinion to corresponding International Application No. PCT/US16/30889 dated Aug. 8, 2016.

(Continued)

*Primary Examiner* — Ghazal B Shehni
(74) *Attorney, Agent, or Firm* — James J. DeCarlo; Greenberg Traurig, LLP

(57) ABSTRACT

The present disclosure provides a method, device and server for managing user login sessions. A session cache list is queried, using a user ID and after a user has successfully logged in with the user ID via the login medium, whether a login session queue corresponding to the user ID exists in the session cache list. If the login session queue exists in the session cache list, a user login status is managed through the login session queue. If the login session queue corresponding to the user ID is absent from the session cache list, a session ID corresponding to the user's login is stored in a login session queue corresponding to the user ID in the session cache list. A legitimate user is able to effectively manage each login created with the user's user ID through the login session queue, and to prevent any login sessions created when the user ID is used to log in from being beyond the legitimate user's control.

18 Claims, 10 Drawing Sheets

(56) References Cited

U.S. PATENT DOCUMENTS

| | | |
|---|---|---|
| 8,510,813 B2 | 8/2013 | Kumar et al. |
| 8,819,803 B1 | 8/2014 | Richards et al. |
| 2005/0102365 A1 | 5/2005 | Moore et al. |
| 2005/0188095 A1 | 8/2005 | Gardiner et al. |
| 2006/0026286 A1 | 2/2006 | Lei et al. |
| 2007/0183365 A1 | 9/2007 | Ohba et al. |
| 2007/0266257 A1 | 11/2007 | Camaisa et al. |
| 2007/0269037 A1 | 11/2007 | Gardiner et al. |
| 2009/0183254 A1 | 7/2009 | Franco et al. |
| 2012/0102201 A1 | 4/2012 | Nakagawa et al. |
| 2012/0174223 A1* | 7/2012 | Eisen .................. H04L 63/0876 726/23 |
| 2012/0323717 A1 | 12/2012 | Kirsch |

FOREIGN PATENT DOCUMENTS

| | | |
|---|---|---|
| WO | 2012107955 A1 | 8/2012 |
| WO | 2015139635 A1 | 9/2015 |

OTHER PUBLICATIONS

International Preliminary Report on Patentability to corresponding International Application No. PCT/US2016/030889 dated Nov. 16, 2017 (9 pages).

* cited by examiner

METHOD, DEVICE AND SERVER FOR MANAGING USER LOGIN SESSIONS

CROSS REFERENCE TO RELATED APPLICATION

This application claims the benefit of Chinese Patent Application No. 201510229467.8, entitled "Method of User Login Session Management, Apparatus Thereof and Server", filed May 7, 2015, which is hereby incorporated by reference herein in its entirety.

TECHNICAL FIELD

The present disclosure relates to the technical field of Internet technology, and particularly to a method, device and server for managing user login sessions.

BACKGROUND

In the prior art, a legitimate user can log into a website through a computing device using the user's username and password. An illegitimate user may steal the user's password when the user logs into a website via a PC, and the illegitimate user may keep the legitimate user's login session on the computing device active by periodically refreshing the web page, which refreshes a login timestamp. The login session can be kept active by refreshing the webpage to refresh the login timestamp. The login session may be kept open by the illegitimate user even if the legitimate user changes the login password. The illegitimate user can still refresh the login session timestamp by refreshing the page to keep the login session, and login status, active despite the legitimate user's password change. The illegitimate user can keep the login session, and status, active without the legitimate user's knowledge or permission.

SUMMARY

It would be beneficial to provide control over a legitimate user's login status. Embodiments of the present disclosure seek to address failings in the art and to provide a capability to effectively manage the login status of a legitimate user's login session(s). In accordance with one or more embodiments of the present disclosure, each login session created by logging in using a legitimate user's user identifier (UID) can be effectively managed using a login session queue. Furthermore, each login session that has been started by logging in using the legitimate user's UID can remain under the control of the legitimate user, thus avoiding any login security issues for the legitimate user in connection with the user's UID.

According to an aspect of the present disclosure, a method for managing user login sessions using a server is provided. The method comprises querying, using a server computing device and a user ID (UID), to detect whether a login session queue corresponding to the user ID exists in a session cache list, the querying being performed after a successful login of the user with the user ID via a login medium; managing, using the server computing device, the user's login status through the login session queue, if the querying detects that the login session queue corresponding to the user ID exists in the session cache list; and storing, using the server computing device, a session ID in a login session queue corresponding to the UID in the session cache list if the querying detects an absence of the login session queue corresponding to the user ID in the session cache list.

According to another aspect of the present disclosure, a server computing device for managing user login sessions is provided. The server computing device comprising a query module querying, using a user ID, to detect whether a login session queue corresponding to the user ID exists in a session cache list, the querying being performed after a successful login of the user with the user ID via a login medium; a managing module managing the user's login status through the login session queue, if the query module detects that the login session queue corresponding to the user ID exists in the session cache list; and a first storage module storing a session ID in a login session queue corresponding to the UID in the session cache list if the query module detects an absence of the login session queue corresponding to the user ID in the session cache list.

According to yet another aspect of the present disclosure a server is provided. The server comprising a processor a storage medium for tangibly storing thereon program logic for execution by the processor, the stored program logic comprising: querying logic executed by the processor for querying, using a user ID, to detect whether a login session queue corresponding to the user ID exists in a session cache list, the querying being performed after a successful login of the user with the user ID via a login medium; managing logic executed by the processor for managing the user's login status through the login session queue, if the querying detects that the login session queue corresponding to the user ID exists in the session cache list; and storing logic executed by the processor for storing a session ID in a login session queue corresponding to the UID in the session cache list if the querying detects an absence of the login session queue corresponding to the user ID in the session cache list.

It is thus clear from the above technical scheme that embodiments of the present disclosure queries, according to the UID, whether there is any existing login session queue corresponding to the UID in the session cache list; if any, the user login status is managed through the login session queue, so that the login status created with a UID can be effectively managed by the legitimate user through the login session queue, and thus any security issues can be prevented for the legitimate user under the circumstance that the login status created with a UID is beyond the legitimate user's control.

DETAILED DESCRIPTION

Figure 1:
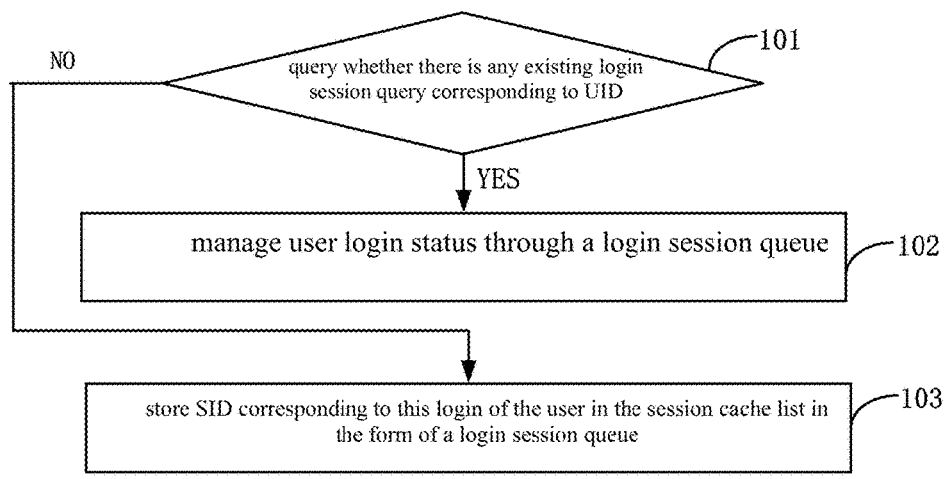
FIG. 1 is a flow diagram of the method for managing user login sessions according to one exemplary embodiment of the present disclosure.

A detailed description of the exemplary embodiments is disclosed herein with examples shown in the Figures. In the following description and in connection with the Figures, unless otherwise specified, the same number in different Figures represents the same or similar element. The following exemplary embodiments do not represent all the embodiments of the present disclosure. On the contrary, the embodiments are intended to be exemplary and to provide examples of a device and method corresponding to some aspects of the present disclosure as described in the Claims.

The terms used in the present disclosure are only for the purpose of describing specified embodiments, instead of limiting the present disclosure. The singular form "a", "the" and "said" in the present disclosure and the appended Claims are to be construed to include the plural form, unless otherwise clearly indicated in the context. In addition, the term "and/or" used herein represents and includes any combination or all the possible combinations of one or a plurality of associated listed items.

It should be understood that although the terms such as "first", "second" and "third' may be used herein to describe all kinds of information, the information shall not be limited to the connotation of these terms. These terms are only used to distinguish the information of the same type among each other. For example, without departing from the scope of the present disclosure, a first information can be called a second information, and similarly a second information can be called a first information. It is determined by the context, e.g., the word "if" used herein can be interpreted as "when", "while" or "in response to the determination".

In accordance with one or more embodiments, when a user browses a website, a login session is a process which can be begin with the user successfully logging in and can end with the user logging off or with a session expiration, the latter of which can be due to a login timeout. During the process, an SID identifying a login session corresponding to the user's login can be generated, and the SID can be used to track the login session corresponding to the user's login.

The present disclosure queries, using the user's UID and after the user has successfully logged in with the UID through a login medium, whether there is any existing login session queue corresponding to the UID in the session cache list. If there is a login session queue corresponding to the user's UID in the session cache list, the user's login status is managed using the login session queue. In so doing, the status of a legitimate user's login with the user's UID can be effectively managed by the legitimate user through the login session queue, and thus any security issues can be prevented for the legitimate user, including the circumstance in which the status of the user's login with the user's UID would otherwise be beyond the legitimate user's control.

In order to further describe the present disclosure, the following embodiments are herein provided.

FIG. 1 is illustrative of a flow diagram of a method for managing user login sessions in accordance with an exemplary embodiment of the present disclosure.

In step 101, the session cache list is queried using the user's UID after the user has successfully logged in with the UID via a login medium to detect whether there is any existing login session queue corresponding to the UID in the session cache list. If a login session queue is detected in the session cache list, step 102 is executed. If a login session queue is not detected in the session cache list, step 103 is executed.

Examples of login mediums, in accordance with at least one embodiment, include a PC, a mobile phone, or a tablet, etc. In one embodiment, the UID can be the user's username used to log in to a website. For example, hanmei2015 is the UID registered by Han Mei on the AAA portal site, and Han Mei can log into the AAA portal site with the UID. In one embodiment, Han Mei can log into the AAA portal site through a PC browser, as well as a mobile phone browser.

In one embodiment, the session cache list can be implemented through a high-performance TAIR cache, so as to store the user login session from the user's perspective. In one embodiment, when the user logs into the AAA portal site, an SID can be created for this login and a mapping relationship between the UID and the SID can be established and stored in the session cache list in a login session queue corresponding to the UID. In one embodiment, a UID corresponds to a login session queue, in which the corresponding login medium (e.g., a PC, a mobile phone, a tablet, etc.), IP address, time and browser information (e.g., browser name, version number, etc.) of each login to the AAA portal site with the UID can be recorded; if the storage capacity of the login session queue is adequate, the login session queue can record all the login history about when and through what login medium the user logged into the AAA portal site with the UID.

In step 102, which is performed if the querying performed in step 101 detects a login session queue corresponding to the UID in the session cache list, the user's login status is managed using the login session queue corresponding to the UID detected the session cache list, and the process ends.

In one embodiment, management of the login session queue can be implemented by determining whether the size of the login session queue exceeds a predetermined threshold. In another embodiment, management of the login session queue can be implemented by determining whether the storage duration of each SID in the login session queue exceeds a predetermined storage cycle. In yet another embodiment, each currently active login session in the login session queue can also be managed based on the login permission settings set by the user.

For example, Han Mei personally logs into the AAA portal site with the UID hanmei2015 and this is not the first time that the hanmei2015 UID has been used by Han Mei to log in to the AAA portal site. A login session queue corresponding to the hanmei2015 UID exists in the session cache list, and the current login session and a login session history of other logins to the AAA portal site with the hanmei2015 UID can be stored in the login session queue. Han Mei logs into the AAA portal site with the hanmei2015 UID on a public computer but forgets to log out. An illegitimate user Li Ming continues the login session, which began with Han Mei logging in to the AAA portal site with Han Mei's UID on the public computer. As discussed herein, Li Ming can continue the login session by performing a web page refresh, for example.

After Han Mei is home and logs in to the AAA portal site with the hanmei2015 UID again, Han Mei can manage the login status of a login session, including the one currently being kept active by Li Ming on the public computer, through the login session queue corresponding to the hanmei2015 UID. If the login session queue indicates that Han Mei remains logged in to the AAA portal site with the hanmei2015 UID on the public computer, Han Mei can log out of the AAA portal site on the public computer, which results in the illegitimate user Li Ming being prevented from continuing to use Han Mei's login session into the AAA portal site. Therefore, each login session created using the UID hanmei2015 can be effectively managed by Han Mei using the login session queue, and thus any security issues can be eliminated, including the security issues associated with Han Mei's login session created with the hanmei2015 UID, which login session's status would otherwise be beyond her control.

In step 103, which is performed if the querying performed in step 101 detects an absence of a login session queue corresponding to the UID in the session cache list, the SID corresponding to the current login of the user is stored in a login session queue in the session cache list, and the process ends.

For example, Han Mei logs in to the AAA portal site with the hanmei2015 UID for the first time, which is the first UID that Han Mei uses. As a result, an SID is created for the login session associated with Han Mei's login with the hanmei2015 UID, and the SID is stored in a login session queue. As discussed in connection with step 102, for example, the login session queue can be used to manage the login status of each login session associated with a login using the hanmei2015 UID.

At least one embodiment provided herein queries, using a UID, whether there is any existing login session queue corresponding to the UID in the session cache list and manages the user login status through the login session queue if an existing login session queue is detected. The at least one embodiment enables legitimate users to effectively manage, through the login session queue, the login status of each login session created by the user logging in with the UID. Furthermore and in accordance with at least one embodiment, any security issues can be prevented or eliminated for a legitimate user, even in a case that a login session created with the UID would otherwise be beyond the legitimate user's control.

Figure 2:
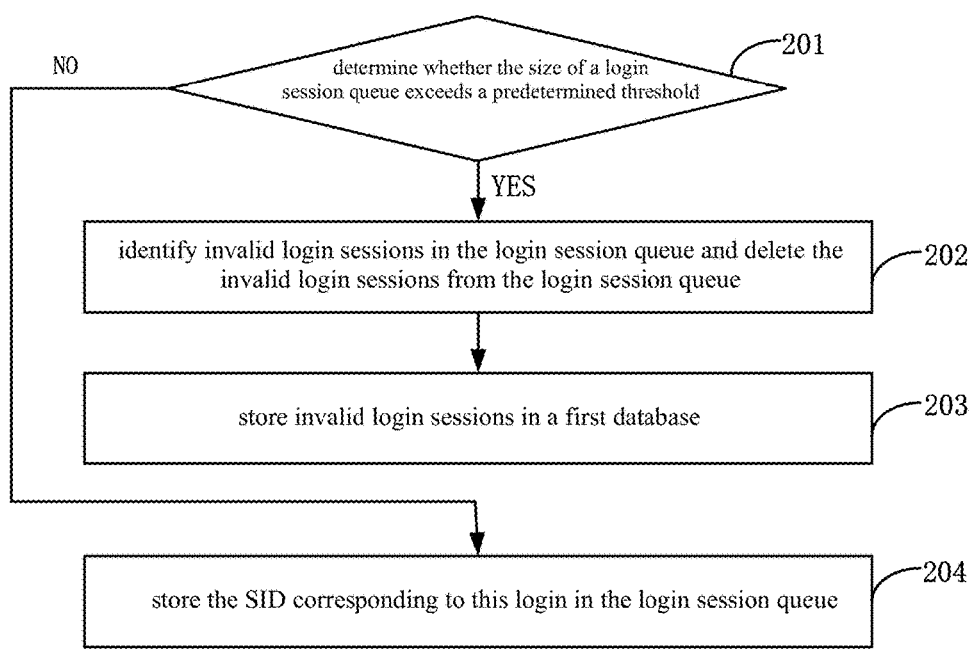
FIG. 2 is a flow diagram of the method for managing user login sessions according to another exemplary embodiment of the present disclosure.
Figure 3:
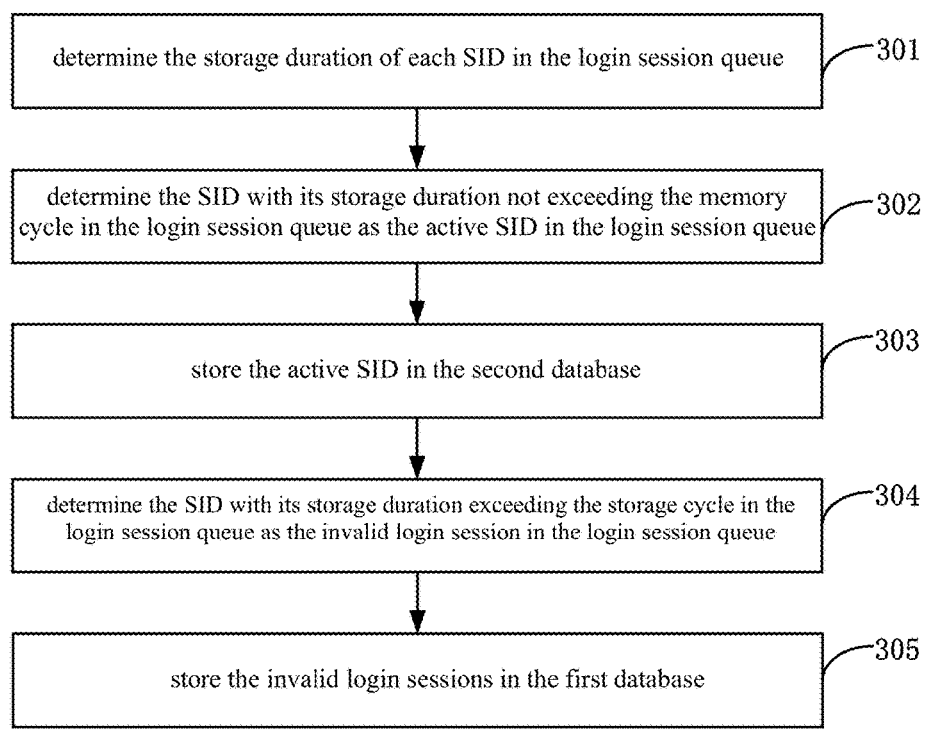
FIG. 3 is a flow diagram of the method for managing user login sessions according to yet another exemplary embodiment of the present disclosure.

In order to effectively manage each login status of each login session of each user of a large number of users in connection with a number of different major websites, a large storage capacity is needed. In order to reasonably store a login session queue corresponding to each UID for which the login status is being managed using a login session queue, embodiments of the present disclosure solve the problem of storage capacity of the session cache list. FIGS. 2 and 3 illustrate a storage capacity management of a login session queue in accordance with one or more embodiments of the present disclosure.

FIG. 2 provides a flow diagram illustrating a method for managing user login sessions in accordance with at least one exemplary embodiment of the present disclosure. In accordance with the at least one exemplary embodiment, storage capacity of a login session queue can be managed by deleting an SID in the login session queue. The method in the example shown in FIG. 2 comprises steps 201-204.

In step 201, a determination is made whether a size of a login session queue exceeds a predetermined threshold. If the login session queue's size exceeds the predetermined threshold, processing continues in step 202. If the login session queue's size does not exceed the predetermined threshold, processing continues in step 204.

For example, in response to use of Han Mei's hanmei2015 UID in a series of login actions on the AAA portal site, an SID corresponding to each login session is created to record the login actions involving Han Mei's hanmei2015 UID. In order to ensure that there is adequate storage capacity for Han Mei's login session queue, the threshold corresponding to the size of Han Mei's login session queue can be set to a value, such as and without limitation a value of 50, so that Han Mei's login session queue can record Han Mei's login status on the AAA portal site in connection with 50 logins using the hanmei2015 UID.

In one embodiment, the predetermined threshold used in accordance with at least one embodiment of the present disclosure can be reasonably determined based on various factors, such as and including user login frequency, a user rating (e.g., a login rating represented by stars, i.e., one-star, two-star, etc.), a user type (e.g., enterprise user and individual user) and a storage capacity of the cache list. For example, an average login frequency of user A is once every day, and an average login frequency of user B is ten times every day. A login rating of user A is five-star (high rating), and a login rating of user B is one-star. A user type of user A is an enterprise user, and a user type of user B is individual user. In such a scenario, the corresponding threshold settings of user A and user B are likely to be different, and when the factors to which user A and user B correspond respectively change, the respective threshold settings can be adjusted to flexibly manage each user's login status.

In step 202, each invalid login session in the login session queue is identified and each login session identified as being invalid is deleted from the login session queue, if the size of the login session queue exceeds the predetermined threshold. Each invalid login session deleted from the login session queue in step 203 is stored in a first database. In one embodiment, by storing the invalid login sessions in the first database, the user can query the login status history of his/her own UID on any login medium (e.g., a PC) in the first database when the user wishes to do so. Processing ends in step 203.

In one embodiment, an invalid login session in the login session queue can be determined according to preset conditions. For example, if a user's invalid login sessions are determined by the user's login time, the oldest login sessions can be deleted. As yet another example, a user's invalid login sessions can be determined by a predetermined login medium set by the user. For example, Han Mei logs into the AAA portal site with the hanmei2015 UID, and her favorite login medium is a PC. Therefore, Han Mei can set a predetermined login medium to be the PC and indicate that any login sessions with the hanmei2015 UID generated using a mobile device are to be deleted.

In step 204, the SID corresponding to a specific login is stored in the login session queue, if the predetermined threshold has not been exceeded, and the process ends.

In this embodiment, by comparing the size of the login session queue and the predetermined threshold, when the size of the login session queue exceeds the predetermined threshold, any invalid login sessions are deleted from the login session queue, so as to promptly clear the invalid login sessions in the login session queue and reduce the storage space of the session cache list by the space occupied by the invalid login session(s).

FIG. 3 provides a flow diagram illustrating a method for managing user login sessions in yet another exemplary embodiment of the present disclosure. In accordance with at least one exemplary embodiment, storage capacity of a login session queue can be controlled by deleting an SID in the login session queue using a storage cycle. The method in the example shown in FIG. 3 comprises steps 301-305.

In step 301, a storage duration of each SID in the login session queue is determined. In one embodiment, if the storage cycle is, for example, set to be 1 month, each SID in the login session queue with a storage duration exceeding 1 month is regarded as an invalid login session.

In step 302 each SID in the login session queue that has a storage duration not exceeding the storage cycle is considered to be an active SID in the login session queue. In step 303, each SID identified as being active in step 302 is stored in a second database.

In steps 302 and 303, by storing the active SID in the second database, when the user wishes to perform a password change, the user's active SID can be obtained from the second database. Each of the active login sessions that is to be deleted in accordance with the user's login permission settings can be deleted, and each active login session that is permitted by the login permission settings can be maintained. The user is able to maintain a plurality of login sessions with the same UID on the same login medium (e.g., a PC) in accordance with the login permission settings in a Browser/Server mode (B/S mode). The user is also able to permit only one login with the same UID via the same login medium. The user is able to flexibly manage the login status of his/her UID.

In step 304, each login session in the login session queue exceeding the storage cycle is determined to be an invalid login session in the login session queue. In step 305, each invalid login session is stored in the first database.

In steps 304 and 305, by storing the invalid login session in the first database, regarded as a security information platform, when it is desirable to ascertain the login status of all of the user's login session, the user's invalid login sessions can be obtained from the first database. Furthermore and when it is desirable to penalize an illegitimate user, any UIDs of the illegitimate user can be taken back, so that the illegitimate user's UIDs can no longer be used by the illegitimate user, and the login status of the illegitimate user can be revoked.

In the exemplary embodiment of FIG. 3, by comparing the storage duration of each SID in the login session queue with the predetermined storage cycle, when the storage duration of the login session queue exceeds the predetermined storage cycle, each SID having a storage duration exceeding the predetermined storage cycle can be deleted from the login session queue, so as to promptly clear the invalid login sessions in the login session queue and reduce the storage space occupied by the invalid login sessions.

In accordance with one or more embodiments of the present disclosure, the embodiments shown in FIGS. 2 and 3 can be combined, so that all of a user's login sessions can be stored. By deleting stored SIDs in accordance with the methods shown in FIGS. 2 and 3, the storage capacity of the cache list can be maintained within a certain range. For example, if the number of active users of the AAA portal site each day is 50,000,000, then for the AAA portal site, the required storage capacity of the server is: (50,000,000 users) * (the login times per day per user) * (the storage space every login session occupies), which means that a storage capacity of at least 1024G is required. In the embodiment of the present disclosure, the storage capacity of the session cache list can be reduced and the management of all the user logins of the AAA portal site can be implemented by the prompt deletion of SIDs in the login session queue.

In the prior art, the security management of a user's login status is undertaken in the Client/Server mode (C/S mode). For example, the instant messaging tool QQ only allows one login for a login medium (e.g., a PC), and other logins from the same medium (i.e., other PCs) would be forced offline; the same UID cannot be flexibly used to simultaneously perform a plurality of logins and remain online via the same login medium. Embodiments of the present disclosure are based on the B/S mode, in which the same UID can be used for a plurality of logins via the same login medium based on the user's login permission settings. Please refer to the exemplary embodiments shown in FIGS. 4A and 4B.

Figure 4A:
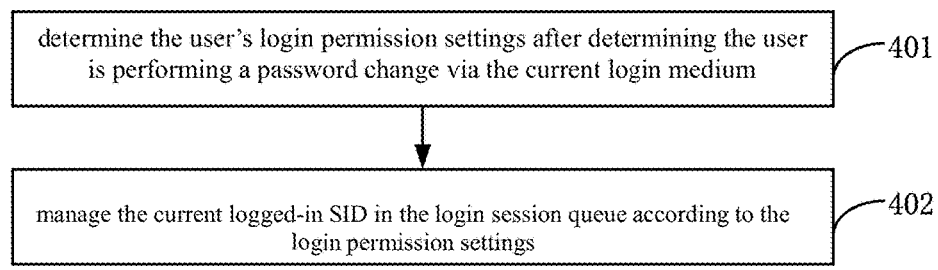
FIG. 4A is a flow diagram of the method for managing user login sessions according to yet another exemplary embodiment of the present disclosure.

FIG. 4A provides flow diagram illustrating a method for managing user login sessions according to yet another exemplary embodiment of the present disclosure. The exemplary embodiment shown in FIG. 4A comprises steps 401 and 402.

In step 401, the user's login permission settings are determined after determining that the user is performing a password change via the current login medium. In one embodiment, Han Mei's login permission settings can be set according to her actual login preference. For example, Han Mei can set simultaneous logins in the office and at home as permitted through the IP address, as well as simultaneous logins on two mobile phones based on the login medium, and so on. Those skilled in the art can well understand that the foregoing login location, login medium and corresponding numbers are only for exemplary descriptive purposes. Han Mei can set login permission according to login medium (e.g., a PC, a mobile phone, a tablet, etc.), IP address, time and browser information (e.g., browser name, version number, etc.) to be recorded in the login session queue, so that Han Mei can have personalized login permission settings.

In step 402, the active login sessions in the login session queue are managed based on the user's login permission settings. In one embodiment, for example, Han Mei's login permission settings specify that only certain IP addresses from the office and home are permitted. When Han Mei's UID is detected to have been used to log in from a different IP address, the login session is deleted, forcing the illegitimate user offline, thereby enabling Han Mei to have control over logins from the different IP address, and avoiding any login security issues.

Figure 4B:
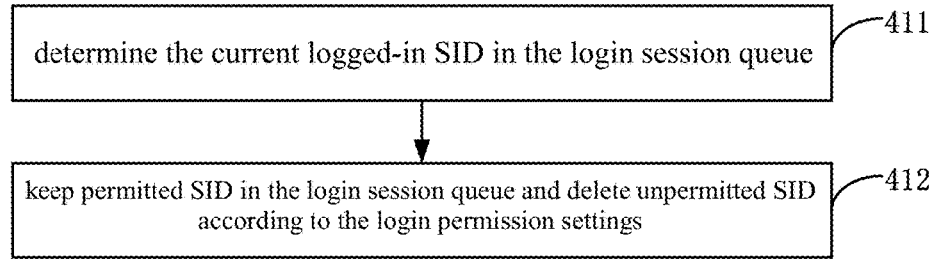
FIG. 4B is a flow diagram of a means of realization in accordance with step 402 in the embodiment as shown in FIG. 4A.

FIG. 4B provides a flow diagram illustrating an implementation in accordance with step 402 in the embodiment as shown in FIG. 4A, wherein step 402 may comprise steps 411 and 412 of FIG. 4B.

In step 411 of FIG. 4B, each currently active login session in the login session queue is identified. In step 412, each currently active login session that is permitted by the user's login permission settings is kept and each currently active login session that is not permitted by the user's login permission settings is deleted.

For example, there are 3 SIDs respectively for home, office and school in Han Mei's current login session queue. Since Han Mei has preset permission for simultaneous logins in the office and at home, the login sessions corresponding to the home IP address and office IP address are permitted to log in, but the SID corresponding to the school will be deleted from the login session queue, denying Han Mei's UID login at school, or preventing Han Mei's child Li Lei from logging into the AAA portal site with Han Mei's UID. Han Mei sets the school IP address as unpermitted, thus, when it is detected that the school IP address is recorded in the login session queue, the SID of login at the school IP address will be deleted, so that Li Lei's school login status is deleted and Li Lei is forced offline. Thus, the login session associated with Li Lei logging in to the AAA portal site through the school IP address can be within Han Mei's control and Han Mei's management of her login status is improved.

In accordance with at least one embodiment, the login permission can be set according to login media (e.g., a PC, a mobile phone, a tablet, etc.), IP address, time and browser information (e.g., browser name, version number, etc.) corresponding to the UIDs recorded in the login session queue, thereby personalizing login permission settings according to the preset login permission settings, improving the flexibility in managing the user's login status.

Figure 5:
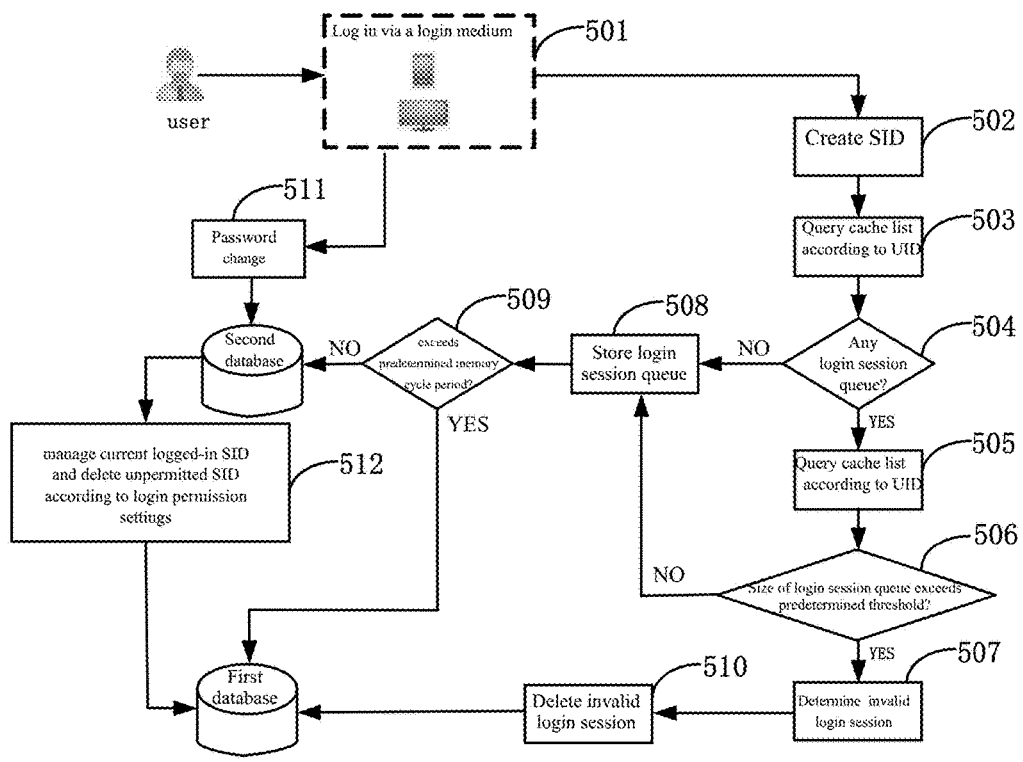
FIG. 5 is a scene graph of the user login session management according to an exemplary embodiment of the present disclosure.

FIG. 5 provides a scene graph of a user's login session management according to an exemplary embodiment of the present disclosure. The exemplary embodiment of FIG. 5 comprises steps 501-512.

In step 501, a user logs in with a UID via a login medium. In addition, having successfully logged in, the user can be directed to corresponding transactions. In order to highlight the object of the present disclosure, the embodiments of the present disclosure do not describe these corresponding transactions in detail.

In step 502, an SID is created for the user's login. In step 503, the session cache list is queried using the user's UID. In step 504, a determination is made whether there is any existing login session queue corresponding to the UID in the session cache list. If it is determined, in step 504, that a login session queue corresponding to the UID exists in the session cache list, execution proceeds to step 505. If it is determined, in step 504, that a login session queue corresponding to the UID does not exist in the session cache list, execution proceeds to step 508.

In step 505, the login session queue corresponding to the UID is obtained from the cache list. In step 506, a determination is made whether the size of the login session queue exceeds a predetermined threshold. If the size of the login session queue exceeds a predetermined threshold, executing proceeds to step 507. Otherwise, execution proceeds to step 508.

In step 507, each invalid login session in the login session queue is identified. In step 510, each invalid login session identified in step 507 is deleted from the login session queue and stored in the first database. Processing ends.

In step 508, a new login session corresponding to the UID is created and stored in the cache list. In step 509, a determination is made whether the storage duration of any SID in the login session queue exceeds the predetermined storage cycle. Each SID with an associated storage duration exceeding the storage cycle period is stored in the first database and each SID with an associated storage during not exceeding the storage cycle is stored in the second database. Processing ends.

In step 511, each currently-active login session is retrieved from the second database when the user is detected as performing a password change operation. In step 512, the currently-active login sessions retrieved from the second database are managed. Any login sessions that are not permitted by the user's login permission settings are deleted.

By managing the user SIDs as described above and in the B/S mode, the user can obtain all login status for a given UID on all login media (e.g., a PC, a mobile phone) through the login session queue, including the active and invalid logins. Moreover, in the B/S mode, according to the embodiments of the present disclosure, a plurality of simultaneous logins with the same UID via the same login medium (e.g., a PC) can be achieved by managing the login permission settings; or, only one login with the same UID via the same login medium may be permitted, while all other logins via other media are forced offline. Embodiments of the present disclosure also enable the login via the current login medium to remain valid while forcing the logins via other login media offline when the user is detected to be performing a password change.

Figure 6:
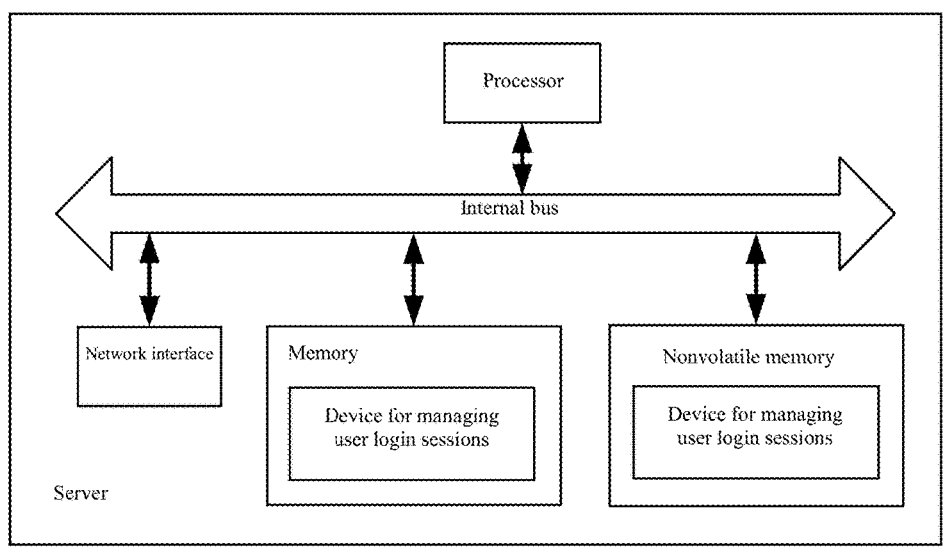
FIG. 6 illustrates a schematic view of the structure of a server according to an exemplary embodiment of the present disclosure.

Corresponding to the above method for managing user login sessions, the present disclosure also discloses a schematic view of the structure of a server in accordance with an exemplary embodiment of the disclosure, shown in FIG. 6. In terms of hardware, the server comprises a processor, an internal bus, a network interface, a memory and a nonvolatile memory. The server may include other hardware. The processor reads the corresponding computer program from the nonvolatile memory into the memory and then runs the program, and thus logically forms a device for managing user login sessions. In addition to a software implementation, it is natural that the present disclosure does not exclude other means of implementation, such as a logic device or a combination of software and hardware. In other words, rather than being limited to the respective logic units, the subject of the following processes can also be hardware or a logic device, for example.

Figure 7:
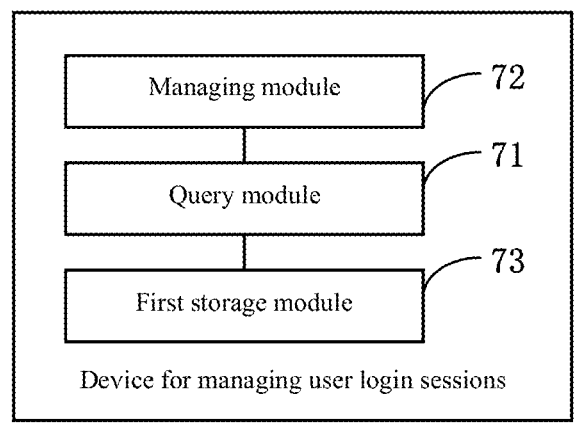
FIG. 7 illustrates a schematic view of the structure of a device for managing user login sessions according to one exemplary embodiment of the present disclosure.

FIG. 7 provides an illustration of a schematic view of the structure of a device for managing user login sessions in accordance with one exemplary embodiment of the disclosure. In a software implementation, the device for managing the login sessions can comprise a query module 71, a managing module 72 and a first storage module 73.

The query module 71 queries, using the UID and after the user has successfully logged in with the UID via a login medium, whether there is any existing login session queue corresponding to the UID in the session cache list. The managing module 72 manages the user login status through the login session queue if the query module 71 detects that there is an existing login session queue. The first storage module 73 stores the SID corresponding to the new login in the session cache list in the form of a login session queue if the query module 71 detects that there is no existing login session queue.

Figure 8:
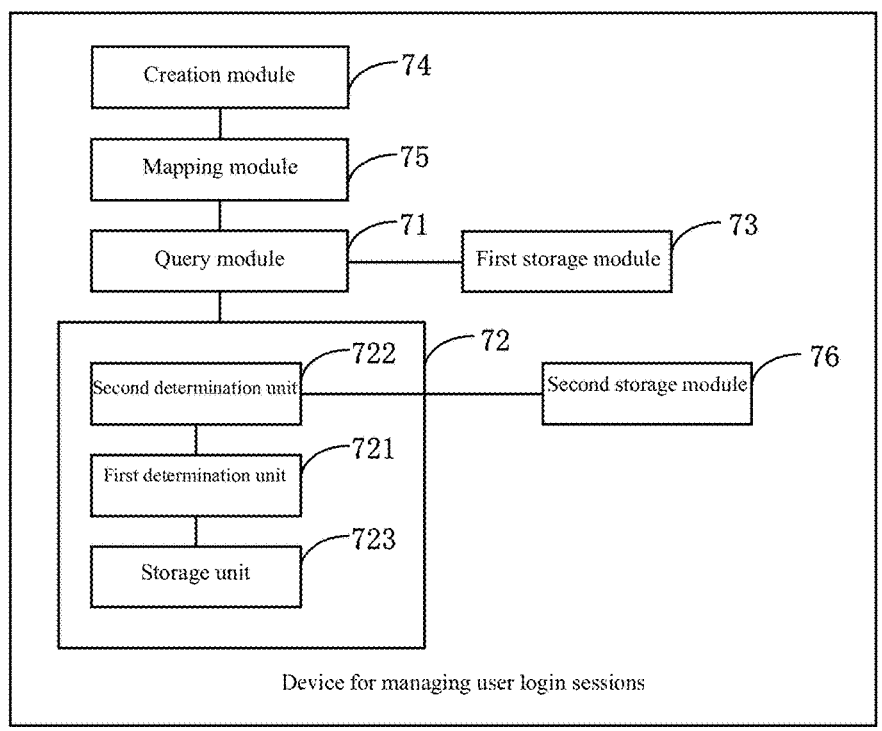
FIG. 8 illustrates a schematic view of the structure of a device for managing user login sessions according to another exemplary embodiment of the present disclosure.

FIG. 8 provides an example of a schematic view of the structure of a device for managing user login sessions according to another exemplary embodiment of the present disclosure. In the exemplary embodiments shown in FIG. 8, the device shown in FIG. 7 can further comprise a creation module 74, which is used to create an SID for this login for the user, an establishment module 75, which is used to establish the mapping relationship between the UID and the SID is created by the creation module 74. The mapping relationship is established by the establishment module 75 for the query module 71, to query, according to the UID, the login session queue in the session cache list.

In one embodiment, the managing module 72 can comprise a first determination unit 721, a second determination unit 722 and a storage unit 723.

The first determination unit 721 determines whether the size of the login session queue detected by the query module 71 exceeds the predetermined threshold. The second determination unit 722 identifies any invalid login sessions in the login session queue and deletes any invalid login session(s)

from the login session queue, if the first determination unit 721 determines that the login session queue's size exceeds the predetermined threshold. The storage unit 723 stores the SID corresponding to the new login in the login session queue, if the first determination unit 721 determines that the size of the login session queue does not exceed the predetermined threshold.

In one embodiment, the device can further comprises a second storage module 76 to store the invalid login session identified by the second determination unit 722 in the first database.

Figure 9:
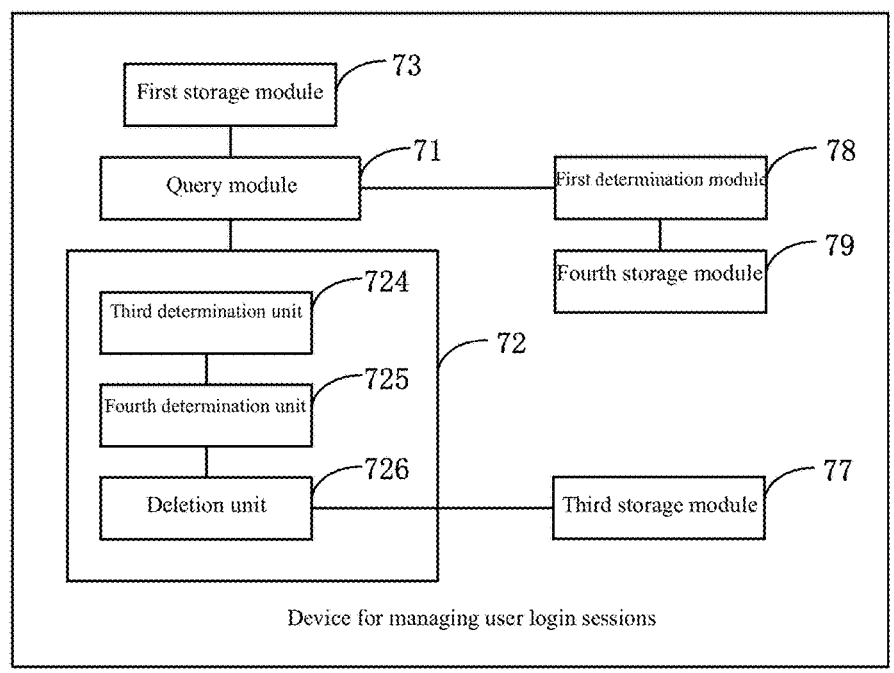
FIG. 9 illustrates a schematic view of the structure of a device for managing user login sessions according to yet another exemplary embodiment of the present disclosure.

FIG. 9 provides an example of a schematic view of a structure of a device for managing user login sessions in accordance with yet another exemplary embodiment of the present disclosure. Based on the embodiment of FIG. 9, the managing module 72 shown in FIG. 7 can comprise a third determination unit 724, a fourth determination unit 725 and a deletion unit 726.

The third determination unit 724 determines whether the storage duration of each login SID in the login session queue detected by the first query module exceeds the predetermined storage cycle. The fourth determination unit 725 identifies each SID (determined by the third determination unit 724) having a storage duration exceeding the predetermined storage cycle in the login session queue as an invalid login session in the login session queue. The deletion unit 726 deletes each invalid login session identified by the fourth determination unit 725 from the login session queue.

In one embodiment, the device can further comprise a third storage module 77 to store, in the first database, each invalid login session deleted by the deletion unit 726.

In one embodiment, the device can further comprise a first determination module 78 to determine each SID (detected by the query module 71) having a storage duration not exceeding the predetermined storage cycle in the login session queue as an active SID, and a fourth storage module 79 to store each active SID determined by the first determination module 78 in the second database.

Figure 10:
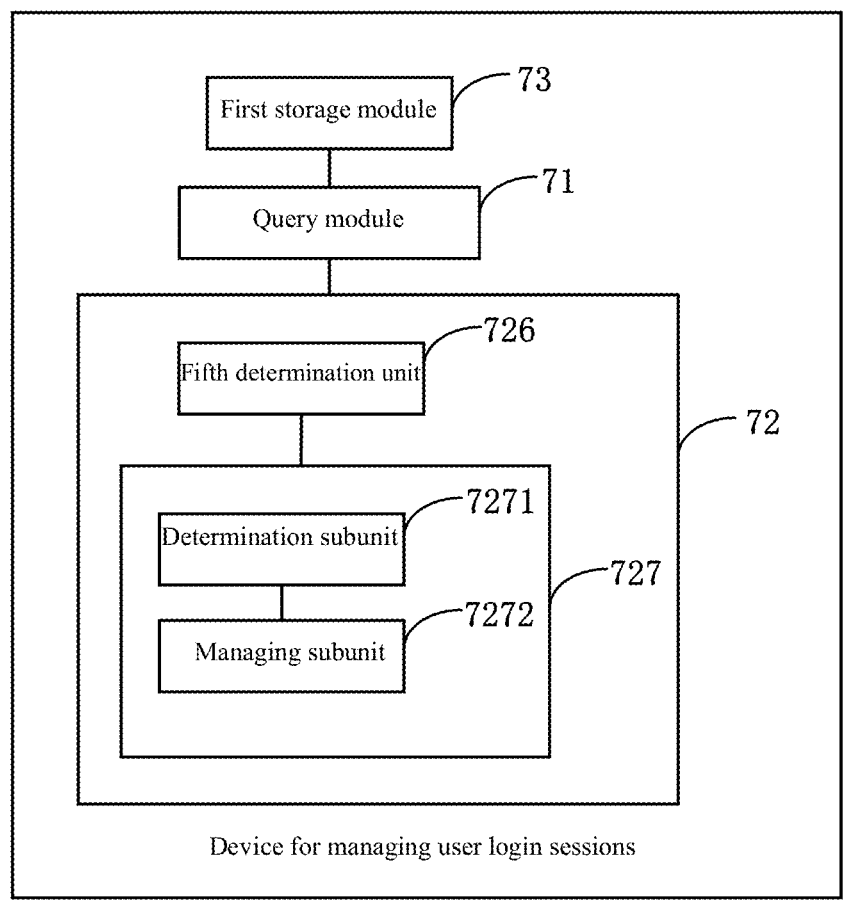
FIG. 10 illustrates a schematic view of the structure of a device for managing user login sessions according to yet another exemplary embodiment of the present disclosure.

FIG. 10 provides an example of a schematic view of the structure of a device for managing user login sessions in accordance with yet another exemplary embodiment of the present disclosure. Based on the embodiment of FIG. 10, the managing module 72 shown in FIG. 7 can comprise a fifth determination unit 726 to determine the user's login permission settings after detecting that the user is performing a password change via the current login medium, and a managing unit 727 to manage the currently-active login sessions in the login session queue according to the login permission settings determined by the fifth determination unit 726.

In one embodiment, the managing module 727 can comprise a determination subunit 7271 to determine the currently-active login sessions in the login session queue, and a managing subunit 7272, to keep the permitted SID in the login session queue and delete the unpermitted SID in accordance with the login permission settings determined by determination subunit 7271.

It is thus clear from the above embodiments that the embodiments of the present disclosure can realize security management of the login sessions based on the Browser/Server mode with various major websites, enabling a legitimate user to effectively manage, using a login session queue corresponding with a UID, the status of login sessions created using the UID, and preventing the login sessions created by logging in with the same UID from being beyond the legitimate user's control, thus avoiding login security issues. Additionally, the storage space of the session cache list occupied by the invalid login session(s) can be reduced by promptly deleting the invalid login session(s).

Upon reviewing the Description and implementing the present disclosure disclosed herein, other embodiments of the present disclosure may become apparent to those skilled in the art. The present disclosure intends to include all the variations, uses or adaptable variations that accord with the general principles of the present disclosure and include common knowledge or conventional technique in the art not disclosed by the present disclosure. The Description and embodiments are only exemplary, and the veritable scope and spirit of the present disclosure are specified in the Claims hereinafter.

It shall be understood that the terms "comprise", "include" or any other variations thereof are intended to mean inclusiveness without exclusion, and thus a process, method, commodity or device including a series of elements comprises not only the listed elements, but also other elements which are not expressly listed, or it also comprises the inherent elements that the process, method, commodity or device hereof has. Without further specification, the expression "comprising a . . . " does not indicate that only the element that the subject comprises is present; other like elements, such as processes, methods, commodities or devices, may also be present.

All the foregoing embodiments are only the preferred embodiments of the present disclosure, which shall not be used to limit this Application. Any modification, equivalent replacement or modification within the spirit and principle of the present disclosure shall be within the scope of the present application.

The invention claimed is:

1. A method comprising:
    detecting, at a server computing device, a successful login of a user via a login medium, the successful login including a user ID (UID) associated with the user;
    querying, using the server computing device and the UID, a first database to detect whether a login session queue corresponding to the user ID exists in a session cache list, the login session queue comprising a mapping of the UID to at least one session ID;
    managing, using the server computing device, the user's login status through the login session queue if the querying detects that the login session queue corresponding to the user ID exists in the session cache list, the managing comprising archiving at least one session ID associated with the UID from the login session queue in a second database; and
    storing, using the server computing device, a session ID in a new login session queue corresponding to the UID in the session cache list if the querying detects an absence of the login session queue corresponding to the user ID in the session cache list, the new login session queue stored in the first database.

2. The method of claim 1, further comprising:
    creating the session ID in response to the user's login; and
    establishing a mapping relationship between the user ID and the session ID.

3. The method of claim 1, managing the user login status through the login session queue further comprising:
    determining, using the server computing device, whether a size of the login session queue exceeds a predetermined threshold;
    determining, using the server computing device, whether each login session in the login session queue is an invalid login session in the login session queue, deleting each invalid login session from the login session queue, and storing each invalid login session deleted from the login session queue in a first database, if the size of the login session queue is determined to exceed the predetermined threshold; and storing, using the server computing device, the session ID corresponding to the user's login in the login session queue, if the size of the login session queue is determined not to exceed the predetermined threshold.

4. The method of claim 3, managing the user login status through the login session queue further comprising:

determining, using the server computing device, the user's login permission settings after detecting that the user is performing a password change via a current login medium; and managing each currently-active session ID in the login session queue in accordance with the login permission settings, comprising:

determining, using the server computing device and for each currently-active session ID in the login session queue, whether the currently-active session ID is a permitted session ID in accordance with the login permission settings;

keeping, using the server computing device, the currently-active session that is identified as permitted in the login session queue, and deleting, from the login session queue, each currently-active session ID identified as unpermitted.

5. The method of claim 1, managing the user login status through the login session queue further comprising:

determining, using the server computing device and for each session ID, whether a storage duration of a login session corresponding to the session ID in the login session queue exceeds a predetermined storage cycle;

determining, using the server computing device and for each session ID, that the corresponding login session is an invalid login session in the login session queue if the storage duration exceeds the predetermined storage cycle; and deleting, using the server computing device and for each invalid login session, the invalid login session from the login session queue and storing the invalid login session in the second database.

6. The method of claim 5, further comprising:

determining, using the server computing device, each session ID in the login session queue having a storage duration not exceeding the predetermined storage cycle as an active session ID in the login session queue; and storing each determined active session ID in the first database.

7. The method of claim 5, managing the user login status through the login session queue further comprising:

determining, using the server computing device, the user's login permission settings after detecting that the user is performing a password change via a current login medium; and managing each currently-active session ID in the login session queue in accordance with the login permission settings, comprising:

determining, using the server computing device and for each currently-active session ID in the login session queue, whether the currently-active session ID is a permitted session ID in accordance with the login permission settings;

keeping, using the server computing device, the currently-active session that is identified as permitted in the login session queue, and deleting, from the login session queue, each currently-active session ID identified as unpermitted.

8. The method of claim 1, managing the user login status through the login session queue further comprising:

determining, using the server computing device, the user's login permission settings after detecting that the user is performing a password change via a current login medium; and managing each currently-active session ID in the login session queue in accordance with the login permission settings.

9. The method of claim 8, managing each currently-active session ID in the login session queue according to the login permission settings further comprising:

determining, using the server computing device and for each currently-active session ID in the login session queue, whether the currently-active session ID is a permitted session ID in accordance with the login permission settings;

keeping, using the server computing device, the currently-active session that is identified as permitted in the login session queue, and deleting, from the login session queue, each currently-active session ID identified as unpermitted.

10. A server computing device comprising:

a processor; and a storage medium for tangibly storing thereon program logic for execution by the processor, the stored program logic comprising:

logic for detecting a successful login of a user via a login medium, the successful login including a user ID (UID) associated with the user;

logic executed by the processor for querying, using the UID, a first database to detect whether a login session queue corresponding to the user ID exists in a session cache list, the login session queue comprising a mapping of the UID to at least one session ID;

logic executed by the processor for managing the user's login status through the login session queue upon detecting that the login session queue corresponding to the user ID exists in the session cache list, the managing comprising archiving at least one session ID associated with the UID from the login session queue in a second database; and logic executed by the processor for storing a session ID in a new login session queue corresponding to the UID in the session cache list upon detecting an absence of the login session queue corresponding to the user ID in the session cache list, the new login session queue stored in the first database.

11. The device of claim 10, further comprising:

logic executed by the processor for creating the session ID in response to the user's login; and logic executed by the processor for establishing a mapping relationship between the user ID and the session ID.

12. The device of claim 10, the logic for managing the user's login status through the login session queue further comprising:

logic executed by the processor for determining whether a size of the login session queue exceeds a predetermined threshold;

logic executed by the processor for determining whether each login session in the login session queue is an invalid login session in the login session queue and deleting each invalid login session from the login session queue, if the size of the login session queue is determined to exceed the predetermined threshold;

logic executed by the processor for storing the session ID corresponding to the user's login in the login session queue, if the size of the login session queue is determined not to exceed the predetermined threshold; and logic executed by the processor for storing, in the second database, each invalid login session.

13. The device of claim 12, the logic for managing the user's login status through the login session queue further comprising:

logic executed by the processor for determining the user's login permission settings after detecting that the user is performing a password change via a current login medium; and logic executed by the processor for managing each currently-active session ID in the login session queue according to the login permission settings in accordance with the login permission settings, the logic for managing the user's login status through the login session queue further comprising:

logic executed by the processor for determining, for each currently-active session ID in the login session queue, whether the currently-active session ID is a permitted session ID in accordance with the login permission settings; and logic executed by the processor for keeping each currently-active session ID to be permitted in the login session queue, and deleting, from the login session queue, each currently-active session ID to be unpermitted.

14. The device of claim 10, the logic for managing the user's login status through the login session queue further comprising:

logic executed by the processor for determining, for each session ID, whether a storage duration of a login session corresponding to the session ID in the login session queue exceeds a predetermined storage cycle;

logic executed by the processor for determining, for each session ID, that the corresponding login session is an invalid login session in the login session queue, if the login session's storage duration exceeds the predetermined storage cycle;

logic executed by the processor for deleting each invalid login session from the login session queue; and logic executed by the processor for storing each invalid login session deleted from the login session queue in the second database.

15. The device of claim 14, further comprising:

logic executed by the processor for determining each session ID in the login session queue having a storage duration not exceeding the predetermined storage cycle as an active session ID in the login session queue; and logic executed by the processor for storing each determined active session ID in the first database.

16. The device of claim 14, the logic for managing the user's login status through the login session queue further comprising:

logic executed by the processor for determining the user's login permission settings after detecting that the user is performing a password change via a current login medium; and logic executed by the processor for managing each currently-active session ID in the login session queue according to the login permission settings in accordance with the login permission settings, the logic for managing the user's login status through the login session queue further comprising:

logic executed by the processor for determining, for each currently-active session ID in the login session queue, whether the currently-active session ID is a permitted session ID in accordance with the login permission settings; and logic executed by the processor for keeping each currently-active session ID to be permitted in the login session queue, and deleting, from the login session queue, each currently-active session ID to be unpermitted.

17. The device of claim 10, the logic for managing the user's login status through the login session queue further comprising:

logic executed by the processor for determining the user's login permission settings after detecting that the user is performing a password change via a current login medium; and logic executed by the processor for managing each currently-active session ID in the login session queue according to the login permission settings in accordance with the login permission settings.

18. The device of claim 17, the logic for managing the user's login status through the login session queue further comprising:

logic executed by the processor for determining, for each currently-active session ID in the login session queue, whether the currently-active session ID is a permitted session ID in accordance with the login permission settings; and logic executed by the processor for keeping each currently-active session ID to be permitted in the login session queue, and deleting, from the login session queue, each currently-active session ID to be unpermitted.

* * * * *